July 14, 1953  M. E. GROTZ  2,645,309
CHOCKING DEVICE FOR VEHICLES
Filed June 15, 1951  2 Sheets-Sheet 1
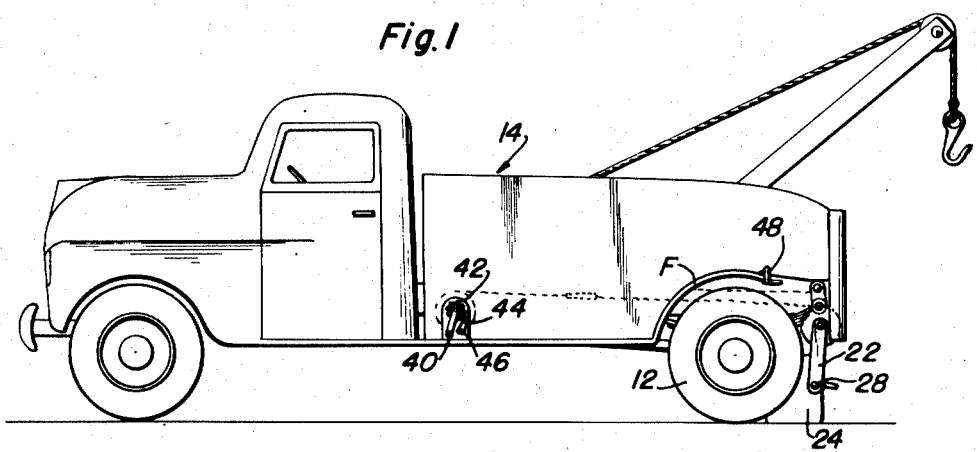
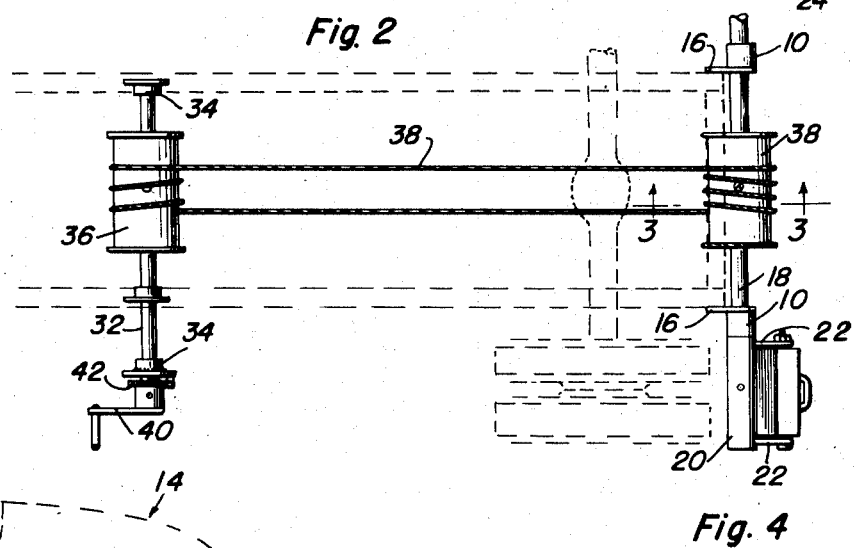
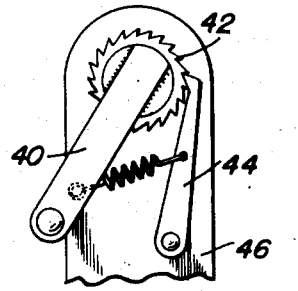
Mike E. Grotz
INVENTOR.

July 14, 1953  M. E. GROTZ  2,645,309
CHOCKING DEVICE FOR VEHICLES
Filed June 15, 1951  2 Sheets-Sheet 2
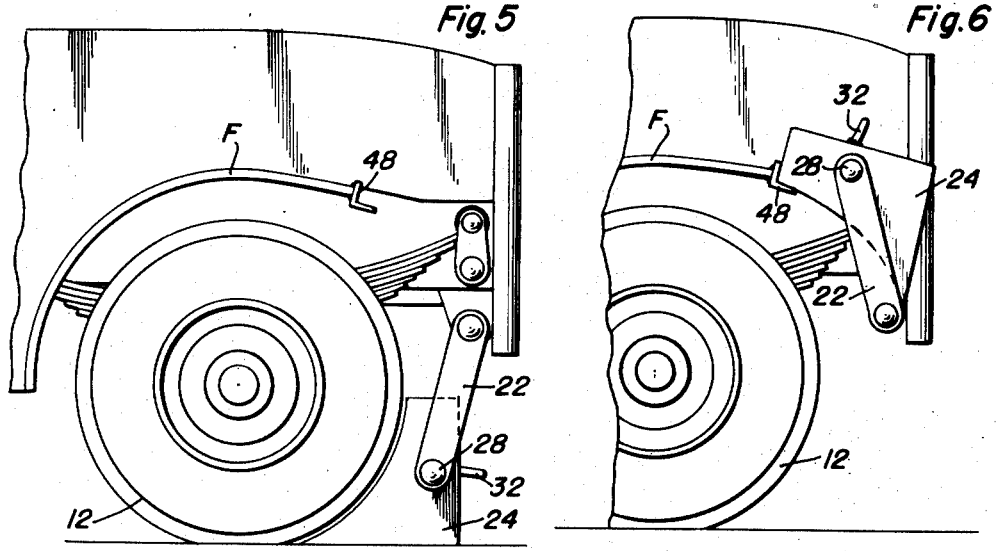
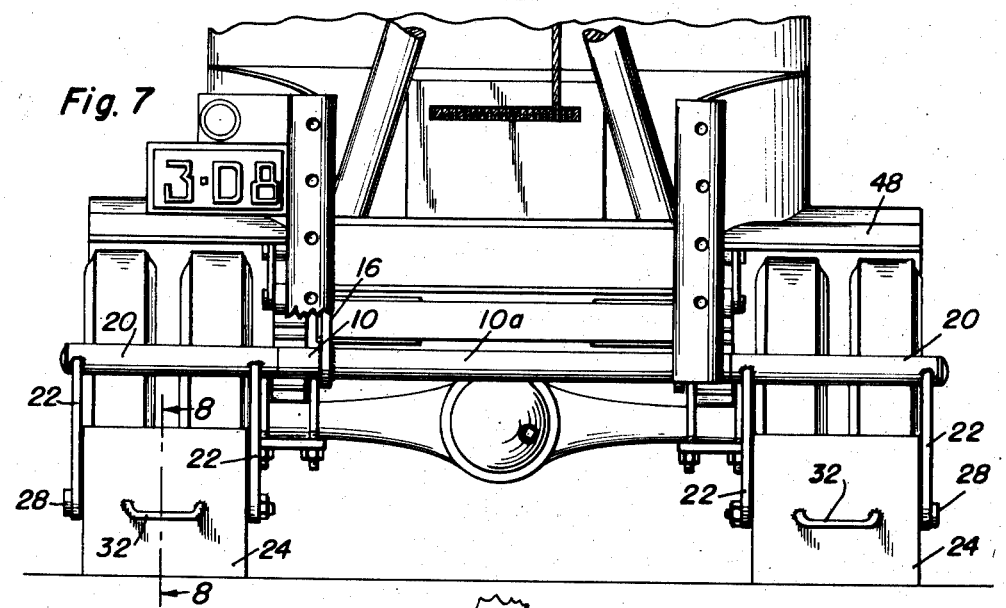
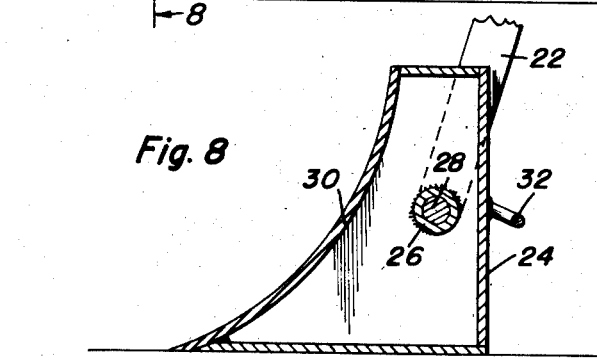
Mike E. Grotz
INVENTOR.
BY
Attorneys

Patented July 14, 1953

2,645,309

UNITED STATES PATENT OFFICE 2,645,309

CHOCKING DEVICE FOR VEHICLES

Mike E. Grotz, Sheridan, Wyo.

Application June 15, 1951, Serial No. 231,817

3 Claims. (Cl. 188—4)

1

This invention relates to new and useful improvements in chocking devices and the primary object of the present invention is to provide a device for chocking the rear wheels of a towing vehicle to prevent rearward movement of the vehicle as the hoist or boom of the vehicle is being employed for raising a vehicle that is to be towed.

Another important object of the present invention is to provide a chocking device involving a rotatable shaft carrying arms that pivotally support shoes, and seats mounted on the vehicle supporting the device for receiving and holding the shoes in an inactive position.

A further object of the present invention is to provide a chocking device for vehicles including a novel and improved means operatively connected to the shaft for rotating the same to selectively move the shoes into and out of the seat.

A still further aim of the present invention is to provide an apparatus of the aforementioned character that is quickly and readily mounted on a vehicle and which is extremely simple and practical in construction, strong and reliable in use, small and compact in structure, and otherwise well adapted for the purposes for which the same is intended.

Figure 1 is a side elevational view of a towing vehicle and showing the invention mounted thereon and with the shoes lowered behind the rear wheels of the vehicle;

Figure 2 is a fragmentary plan view of the device mounted on a vehicle chassis (dotted lines);

Figure 3 is a vertical sectional view taken substantially on the plane of section line 3—3 of Figure 2, and with dotted lines showing one of the shoes partially raised and completely raised;

Figure 4 is an enlarged side view of Figure 2 to illustrate the crank handle for raising the shoes;

Figure 5 is an enlarged fragmentary side view of Figure 1;

Figure 6 is a view similar to Figure 5 but showing the shoes raised and positioned in the seats;

Figure 7 is a rear view of Figure 1 but showing the bearing for the shoe supporting shaft modified and the raising means removed since the shoes are manually raised in this form of the device; and Figure 8 is an enlarged vertical sectional view taken substantially on the plane of section line 8—8 of Figure 7.

Referring now to the drawings in detail, where-

2 in, for the purpose of illustration, there is disclosed a preferred embodiment of the present invention, the numeral 10 represents a pair of bearings that are disposed behind the rear wheels 12 of a vehicle 14. The bearings 10 are fixed to arms 16 that are secured by suitable means to a rear portion of the vehicle to retain the bearings 10 transversely of the vehicle and disposed in a horizontal position.

A shaft 18 is rotatably supported in the bearings 10 and its ends project outwardly from the bearings and enter tubes 20 that are held secured to the shaft by set screws. A pair of spaced parallel arms 22 are fixed by welding or the like to the tubes 20 and project laterally from the tubes.

Hollow shoes 24 have horizontal sleeves 26 fixed therein through which extend pivot pins 28. The ends of the pins extend through apertures in the outer ends of the arms 22 to pivotally secure the shoes to the arms 22. The shoes 24 each includes a curved forward wall 30 that will engage behind the wheels 12 and a hand grip 32 to permit manual raising of the shoes.

A second shaft 32 parallels the shaft 18 and is rotatably supported in bearings 34 on the vehicle 14 in front of the shaft 18. The shaft 32 carries a cable drum 36 that is connected to a cable drum 38 on the shaft 18 by an endless cable 38 whereby the shaft 18 may be rotated to selectively raise and lower the arms 22 and shoes 24 as a unit.

Means is provided whereby the shaft may be rotated in a step-by-step manner. This means comprises a crank handle 40 supporting a ratchet 42 that is engaged by a spring-urged pawl 44 carried by a support 46 for the shaft 32.

Angle iron seats 48 are fixed on the vehicle above the wheels 12 and receive and support the shoes 24 therein when the shoes are raised to an inactive position as shown in Figure 6 to position the pins 28 forwardly of and above the shaft 18.

Figure 7 illustrates the bearings 10 integrally formed with a central bearing or tube 10a in the event the mechanical raising means is not to be employed in conjunction with the shoe holding shaft.

It will be noted that the shoes 24 constitute the rear portion of the vehicle fenders when they are raised with the walls 30 forming a continuation of the vehicle fenders F.

The lock shoe thus described takes the weight of the tires and springs of a truck when in use and permits the truck to lift a greater load than it is otherwise capable of doing. The shoes may be manually raised and lowered by hand holds at the rear of the shoes, thereby obviating the lifting mechanism shown in Figures 1-4, inclusive.

The shoes illustrated may be modified to include roughened, serrated or corrugated bottom walls to effectively grip relatively soft ground and to increase the traction of the shoes.

Having described the invention, what is claimed as new is:

1. In a vehicle including rear wheels and fenders extending over the wheels, a tube mounted on the rear of the vehicle behind the wheels, said tube being supported horizontally upon the rear of the vehicle and extending transversely of the vehicle, a shaft supported in said tube for rotation and having its ends disposed exteriorly of the tube, a pair of laterally projecting arms fixed to each end of said shaft, a shoe pivoted between each pair of arms, and rearwardly facing angle iron seats fixed to the fenders above the wheels and forwardly of the shaft to support the shoes when the latter are raised, the pivots securing the arms to the shoes being disposed forwardly of the shaft and behind the seats when the shoes are engaged in the seats.

2. The combination of claim 1 and means operatively connected to the shaft for rotating the shaft to position the shoes against the seats.

3. In a vehicle including rear wheels and fenders extending over the wheels, a tube mounted on the rear of the vehicle behind the wheels, said tube being supported horizontally upon the rear of the vehicle and extending transversely of the vehicle, a shaft supported in said tube for rotation and having its ends disposed exteriorly of the tube, a pair of laterally projecting arms fixed to each end of said shaft, a shoe pivoted between each pair of arms, and rearwardly facing angle iron seats fixed to the fenders above the wheels and forwardly of the shaft to support the shoes when the latter are raised, the pivots securing the arms to the shoes being disposed forwardly of the shaft and behind the seats when the shoes are engaged in the seats, said shoes having forward corners composed of relatively perpendicular portions engaged against the flanges of the seats in order to support the shoes in their raised position.

MIKE E. GROTZ.

References Cited in the file of this patent

UNITED STATES PATENTS

| Number | Name | Date |
|---|---|---|
| 1,442,262 | Folsom | Jan. 16, 1923 |
| 2,014,565 | Hartshorne | Sept. 17, 1935 |
| 2,036,910 | Balensiefer | Apr. 7, 1936 |
| 2,151,014 | Curtiss | Mar. 21, 1939 |
| 2,182,044 | Ackerman | Dec. 5, 1939 |

FOREIGN PATENTS

| Number | Country | Date |
|---|---|---|
| 314,006 | Great Britain | Oct. 8, 1928 |